US012561219B2

(12) United States Patent
Yang et al.

(10) Patent No.: US 12,561,219 B2
(45) Date of Patent: Feb. 24, 2026

(54) CHIP WITH BUILT-IN VERIFICATION AND METHOD FOR BUILT-IN CHIP VERIFICATION

(71) Applicant: Shanghai Zhaoxin Semiconductor Co., Ltd., Shanghai (CN)

(72) Inventors: Qunyi Yang, Beijing (CN); Fan Yang, Beijing (CN); Xu Wang, Beijing (CN); Zhongxiang Cheng, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 108 days.

(21) Appl. No.: 18/412,702

(22) Filed: Jan. 15, 2024

(65) Prior Publication Data

US 2025/0123935 A1    Apr. 17, 2025

(51) Int. Cl.
*G06F 11/27*          (2006.01)
*G06F 11/22*          (2006.01)

(52) U.S. Cl.
CPC .......... *G06F 11/27* (2013.01); *G06F 11/2236* (2013.01)

(58) Field of Classification Search
CPC .... G06F 11/27; G06F 11/2236; G06F 30/398; G06F 5/065
See application file for complete search history.

(56) References Cited

U.S. PATENT DOCUMENTS

| | | | | |
|---|---|---|---|---|
| 5,915,099 A | * | 6/1999 | Takata ................ | G06F 13/4027 710/100 |
| 9,946,624 B1 | * | 4/2018 | Kfir ........................ | G06F 11/348 |
| 2003/0071665 A1 | * | 4/2003 | Oyama ................ | H03L 7/0814 327/116 |
| 2012/0042212 A1 | * | 2/2012 | Laurenti ............ | G06F 11/3466 714/45 |
| 2019/0140007 A1 | * | 5/2019 | Tsuchiya ............... | H01L 25/167 |

* cited by examiner

*Primary Examiner* — Kamini B Patel
(74) *Attorney, Agent, or Firm* — McClure, Qualey & Rodack, LLP

(57) ABSTRACT

A chip with built-in verification is shown. The signals of key nodes within the chip are collected as operational information. Verification hardware built into the chip includes a plurality of registers, which are programmed to define a branch-type trigger condition. The branch-type trigger condition is formed by sequence-related events. The verification hardware includes an arithmetic module that generates a debugging prompt in response to the branch-type trigger condition defined in the plurality of registers being satisfied by the operational information.

20 Claims, 9 Drawing Sheets

CHIP WITH BUILT-IN VERIFICATION AND METHOD FOR BUILT-IN CHIP VERIFICATION

CROSS REFERENCE TO RELATED APPLICATIONS

This Application claims priority of China Patent Application No. 202311330149.1, filed on Oct. 13, 2023, the entirety of which is incorporated by reference herein.

BACKGROUND OF THE DISCLOSURE

Field of the Disclosure

The present disclosure relates to chip verification.

Description of the Related Art

After the chip design is completed, verification is required. If there is an error in a chip, verification technology is needed to detect the error and find where it is. In the prior art, a logic analyzer extracts operational information from the input and output pins of the chip and, accordingly, determines whether to call for a debug procedure. For example, from an I/O pin of a memory, such as a dynamic random access memory (DRAM), a logic analyzer extracts 64-bit operational information about the chip for analysis, to verify the chip. The logic analyzer may operate several analysis schedules to determine whether to trigger a debug procedure to perform error analysis and find the location of the error.

However, logic analyzers are expensive. Thanks to recent technological developments, chip clocks are getting faster and faster, and the logic analyzers on the market are not able to deal with these high-frequency clocks.

Developing alternatives to expensive logic analyzers and achieving accurate verification of high-frequency products is a major issue in this technical field.

BRIEF SUMMARY OF THE DISCLOSURE

A chip with built-in verification is shown. A trigger condition judgment to start a debug procedure is implemented inside the chip. When the chip's operational information meets a predetermined trigger condition, verification hardware built into the chip will package and output a debugging prompt along with the operational information for error analysis and locating the error. In some exemplary embodiments, the operational information is sampled according to a high-frequency clock. In this disclosure, high-frequency chip verification is achieved without the need for expensive logic analyzers.

A chip with built-in verification in accordance with an exemplary embodiment of the disclosure is shown. Signals of key nodes within the chip are collected as operational information. The chip includes verification hardware that includes a plurality of registers. The registers are programmed to define a branch-type trigger condition, wherein the branch-type trigger condition is formed by sequence-related events. The verification hardware further includes an arithmetic module that generates a debugging prompt in response to the branch-type trigger condition defined in the plurality of registers being satisfied by the operational information.

In another exemplary embodiment, a method for built-in verification on a chip is shown. The method includes steps of: collecting signals from a plurality of key nodes of the chip to form operational information; programming a plurality of registers to define a branch-type trigger condition, wherein the branch-type trigger condition is formed by sequence-related events; and generating a debugging prompt in response to the branch-type trigger condition defined in the plurality of registers being satisfied by the operational information.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is determined by reference to the appended claims. The various units, modules, or functional blocks mentioned below may be implemented by a combination of hardware, software, and firmware, and may include special circuits. The different units, modules, or functional blocks are not limited to being implemented separately, but may be combined together to share certain functions.

Figure 1:
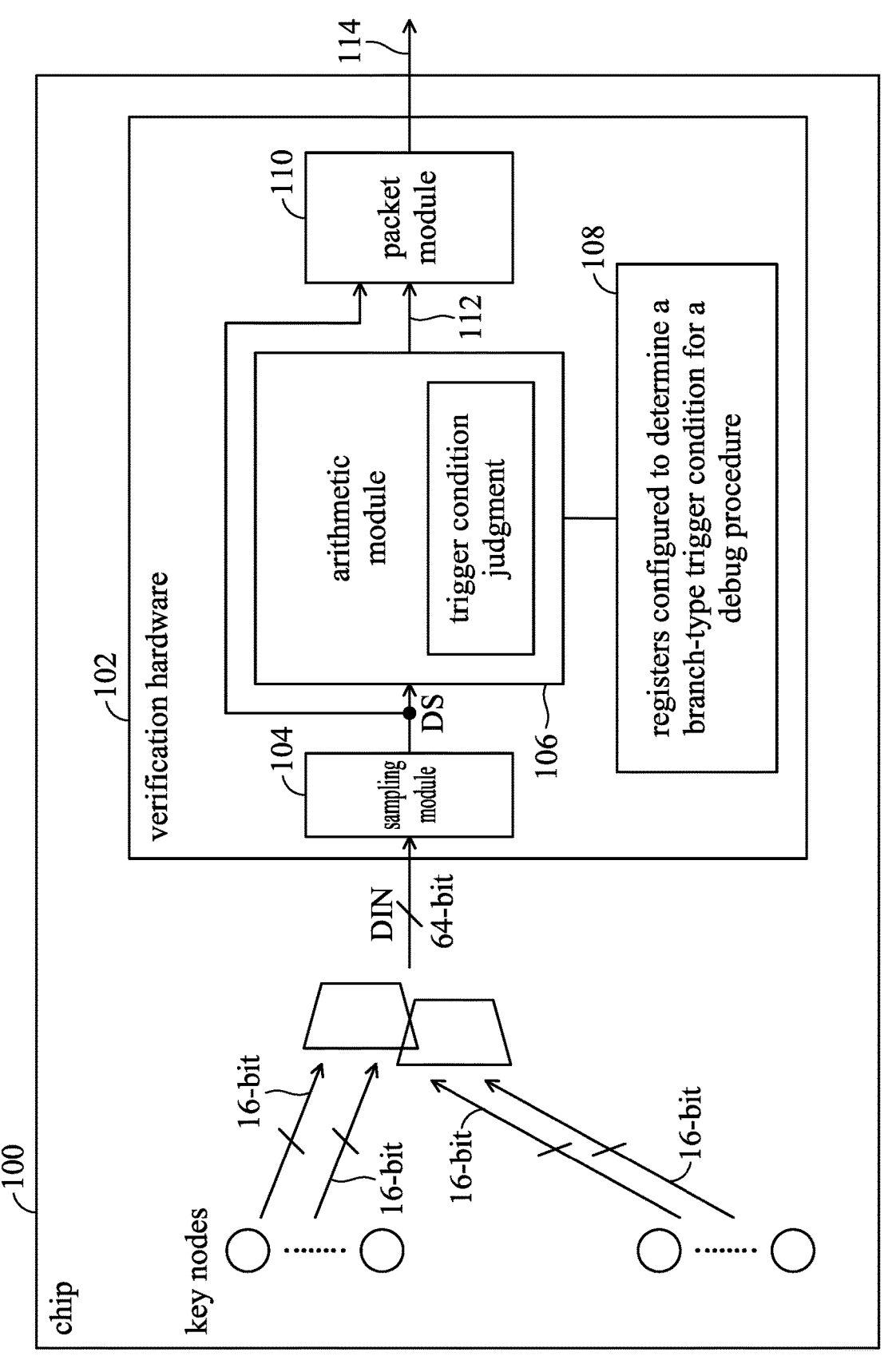
FIG. 1 illustrates a chip 100 in accordance with an exemplary embodiment of the disclosure.

FIG. 1 illustrates a chip 100 in accordance with an exemplary embodiment of the disclosure, including a plurality of key nodes and built-in verification hardware 102. Each key node may correspond to a functional module that generates signals when the chip 100 operates. The built-in verification hardware 102 includes a sampling module 104, an arithmetic module 106, registers 108, and a packet module 110.

The key nodes on the chip 100 may be selected according to the designer's needs. Through a multiplexer, the key signals (e.g., 16 bits each) obtained from the selected key nodes are collected as operational information DIN (e.g., 64 bits), and then sampled by the sampling module 104 to generate sampled operational information DS. According to the registers 108, the arithmetic module 106 analyzes the sampled operational information DS to determine whether a branch-type trigger condition is satisfied to start a debug procedure. The branch-type trigger condition is formed by sequence-related events, which can detect error more accurately. The packet module 110 can packet the sampled operational information DS into general information packets to output from the chip 100 in the normal way. If the sampled operational information DS meets the branch-type trigger condition, the arithmetic module 106 outputs a debugging prompt 112 (for example, indicating a time tag about the abnormal events), and the packet module 110 packets the debugging prompt 112 into a special information packet to output from the chip 100 for error analysis and locating the error.

With the verification hardware 102, the chip 100 itself can generate the debugging prompt in response to a series of specific operations in timing. There is no need to use an expensive external logic analyzer.

In an exemplary embodiment, the designer can program the registers 108 through a user interface of the running software, to define branch-type trigger condition. Through the user interface of the running software, the designer can also select key nodes to monitor.

In an exemplary embodiment, the chip 100 is a processor chip, and the verification hardware 102 is built into the north bridge module of the processor chip.

The aforementioned information packets 114 (including general and special information packets) for error analysis and locating the error can be transferred to a specific space of a memory (such as a DRAM) or a PCIE debug card.

If the output destination is a specific space of a memory (e.g., the space from DRAM address 1000 to DRAM address 2000), the information packets 114 are overwritten to this specific space. In response to the special information packet carrying the debugging prompt 112 being programmed into the specific space, the verification hardware 102 may stop the chip 100 (for error analysis and locating the error) after the programming of a predetermined number of sampled operational information DS is programmed into the specific space. The predetermined number of sampled operational information DS is specified beforehand by the verification hardware 102. In an exemplary embodiment, the space occupied by the general information packets carrying sampled operational information DS, which is programmed into the specific space after the special information packet of the debugging prompt 112, is half the size of the specific space. In this way, the specific space stores the operational information just around the error. The verification hardware 102 may store the storage address of the special information packet carrying the debugging prompt 112 into a register and, accordingly, the running software performs error analysis and locating the error. In an exemplary embodiment, when the information packets 114 are programmed into the specific space in order from the lowest address to the highest address, the above-mentioned overwriting means that when the specific space is used up, the newly generated information packet 114 is programmed into the lowest address in the specific space. In this way, the older information packets 114 previously programmed into the specific space are overwritten (that is, cleared from the specific space). The specific space is only used to store a fixed number of packets with the latest information.

In another exemplary embodiment, the output destination is a PCIE debug card, which is configured to capture the information packets 114. The special information packet carrying the debugging prompt 112 is programmed to a specific address of the PCIE debug card. When the analysis software captures the special information packet at the specific address of the PCIE debug card, it can continue to capture a certain number of general information packets carrying the sampled operational information DS, to facilitate error analysis and locating the error.

In an exemplary embodiment, in order to meet the design requirements, the max clock frequency used in the chip is twice the general operating clock CLK (e.g., if the general operating clock CLK is 1×CLK (one-times frequency clock), then the max clock frequency used in the chip is 2×CLK (double-frequency clock)). In order to ensure that the signals in the double-frequency clock domain (2×CLK) are not missed, the sampling module 104 of the verification hardware 102 may use a higher-frequency clock (e.g., 4×CLK, oscillating at a frequency that is a multiple of the highest operating frequency 2×CLK of the chip 100) to sample the operational information DIN and generate the sampled operational information DS. The verification hardware 102 has the capability to verify a high-frequency chip. In particular, the arithmetic module 106 may operate at the general operating clock CLK (that is 1×CLK), to check whether the branch-type trigger condition is satisfied. There is no need for expensive high-speed processing capability.

In an exemplary embodiment, the verification hardware 102 may have several clock input terminals (not shown in the figure, and the clock input pins are configured to receive clocks 1×CLK, 2×CLK, and 4×CLK). The verification hardware 102 may further have a reset input terminal RST_N (not shown in the figure), an input terminal DIN for the operational information DIN [63:0], and an output terminal for the debugging prompt 112. In an exemplary embodiment, the sampling rate of a quadruple-frequency clock 4×CLK is realized by sampling a signal at the rising edges and the falling edges of the double-frequency clock 2×CLK.

In the software design, the verification hardware 102 needs to program a global register RSTART (not shown in the figure), which is configured to enable the trigger condition judgment. The verification hardware 102 further needs to program a global register OUT_DST (not shown in the figure), which is configured to set the memory, or the PCIE debug card as the destination for storing packets. The verification hardware 102 further needs to program a global register DRAM_trigger_addr (not shown in the figure), which is configured to set the memory address storing the special information packet carrying the debugging prompt 112. The verification hardware 102 further needs to program a global register PCIE_trigger_add (not shown in the figure), which is configured to set an address on the PCIE debug card to store the special information packet carrying the debugging prompt 112. The verification hardware 102 further needs to program a global register OUT_ADDR_START (not shown in the figure), which is configured to set the starting address of the specific space of the memory for storing packets. The verification hardware 102 further needs to program a global register OUT_ADDR_END (not shown in the figure), which is configured to set the end address of the specific space of the memory for storing packets.

In an exemplary embodiment, multiple branch event groups are proposed to determine whether the operational information DIN satisfies a branch-type trigger condition. Each branch group includes a plurality of branch events. In an exemplary embodiment, a branch-type trigger condition used to start a debug procedure includes a sequence of events: a branch event A of the first branch event group; a branch event B of the second branch event group; a branch event C of the third branch event group; and a branch event D of the fourth branch event group. The arithmetic module 106 sequentially checks the branch event groups to determine whether the operational information DIN matches a series of branch events which form the branch-type trigger condition. According to such a branch-type trigger condition, the more detailed abnormal operations can be detected. Errors can be accurately identified based on the operational information DIN collected in a period of time.

The designer can define the branch event groups and the branch events in each branch event group by programming the registers 108 through the user interface of the running software (e.g., BIOS, or OS). According to the branch groups defined in the registers 108, the arithmetic module 106 starts from an initial branch event group to perform branch event matching on the operational information DIN, and jumps between the branch event groups until the branch-type trigger condition is satisfied to generate the debugging prompt 112. For each branch event group, the corresponding registers (108) define a plurality of branch events, and plan actions in response to when the corresponding branch event has been matched, to decide whether to jump to another branch event group or not, or whether to generate the debugging prompt 112.

The following discussion takes four branch event groups G0 . . . G3 as an example, and each branch event group G #(#is the group number, 0~3) includes four branch events B0_G # . . . B3_G #.

Referring to the branch event group G0, it includes four branch events B0_G0 . . . B3_G0. Each branch event is defined by a combination of a characteristic register RMDATA_B #_G0[63:0] and a mask register RMMASK_B #_G0[63:0], where #is the branch event number ranging from 0 to 3. For error detection, the sampled operational information DS[63:0] is divided into several parts. For example, the sampled operational information DS[63:0] may be divided into four parts. The first part (for example, DS[15:0]) shows the read address for reading data from the memory. The second part (for example, DS[31:16]) shows the read data from the memory. The third part (for example, DS[47:32]) shows the write address for writing data into the memory. The fourth part (for example, DS[63:48]) shows the write data to be written into the memory. Corresponding to the different parts of the sampled operational information DS[63:0], the characteristic register RMDATA_B #_G0[63:0] is divided into different parts, too. For example, the characteristic register RMDATA_B #_G0[63:0] is also divide into four parts. The first part (for example, RMDATA_B #_G0[15:0]) is a predetermined read address (e.g., about an abnormal read of the memory). The second part (for example, RMDATA_B #_G0[31:16]) is a prede-termined read data (e.g., abnormal read data). The third part (for example, RMDATA_B #_G0[47:32]) is a predeter-mined write address (e.g., about an abnormal read of the memory). The fourth part (for example, RMDATA_B #_G0 [63:48]) is a predetermined write data (e.g., abnormal write data). In the mask register RMMASK_B #_G0[63:0], "0" means that the corresponding bit in the sampled operational information DS[63:0] is ignored, and "1" means that the corresponding bit in the sampled operational information DS[63:0] should be considered. The sampled operational information DS[63:0](including the four parts mentioned above) is compared with the branch events defined by the pairs of registers (RMDATA_B #_G[63:0] and RMMASK_B #_G0[63:0]) to discover the matched branch event. In an exemplary embodiment, the branch event matching procedure includes: performing a bitwise AND operation on the sampled operational information DS[63:0] and the mask register RMMASK_B #_G0[63:0](i.e., DS[63: 0]& RMMASK_B #_G0[63:0]); and determining whether the obtained bitwise AND result matches the characteristic register RMDATA_B #_G0[63:0]. If the bitwise AND result is the same as the characteristic register RMDATA_B #_G0 [63:0], it means that the sampled operational information DS matches this branch event; otherwise, it means that the sampled operational information DS does not match this branch event.

For the trigger condition judgment, the arithmetic module 106 is equipped with at least one counter (e.g., two counters counter0 and counter1, not shown in the figures, are used in the following example), and at least one timer (e.g., two timers timer0 and timer1, not shown in the figures, are used in the following example). The arithmetic module 106 provides each counter/timer with a register, to store the related system variables. The system variable corresponding to a counter is a counting result, and the system variable corresponding to a timer is a timing result. The matched branch event will trigger the counters (e.g., counter0 and counter1), and the timers (e.g., timer0 and timer1) to oper-ate. The different branch events may cause the counters (counter0 and counter1) and timers (timer0 and timer1) to operate in the different ways. Each branch event group G #may have its own counting reference and timing reference (hereinafter understood as reference values) for determina-tion of whether to jump to another branch event group or not, or whether to generate the debugging prompt 112. In an exemplary embodiment, the system variables changed according to the counters or the timers are shared by all branch event groups. That is, the system variables changed according to the counters or the timers are global variables.

With respect to the counters counter0 and counter1, the branch event group G0 uses the registers RCNT0_G0[31:0] and RCNT1_G0[31:0] to respectively set their reference values. With respect to the timers timer0 and timer1, branch event group G0 uses registers RTIMER0_G0[31:0] and RTIMER1_G0[31:0] to respectively set their reference val-ues.

Corresponding to each branch event B #_G0, an action register RACTION_B #_G0[31:0] is provided. Each action register is programmed so that, in response to when the corresponding branch event has been matched, it is defined how to change the system variables (such as being main-tained without change, or being increased, or being decreased, or being reset), and how to judge the system variables based on the reference values to determine whether to jump out of a current branch event group or not (for example, do not consider it, or jump out of the group if it is less than/equal to/greater than its reference value). Each action register further defines that in response to when it has been determined to jump out of the current branch event group, to jump to another branch event group or to generate the debugging prompt 112.

In an exemplary embodiment, the action register RAC-TION_B #_G0[31:0] is programmed so that, in response to when the branch event B #_G0 has been matched, it is defined how the system variables are changed and judged, including: how the counters counter0 and counter1 change their counting results (such as maintain a counting result without change, or increase/decrease/reset a counting result), and how the counting results are judged with respect to their reference values predetermined in the registers RCNT0_G0[31:0] and RCNT1_G0[31:0](for example, do not consider them, or jump out of the branch event group G0 if a counting result is less than/equal to/greater than its reference value); and, how the timers timer0 and timer1 control their timing results (such as maintain a timing result without change, or increase/decrease/reset a timing result), and how the timing results are judged with respect to their reference values predetermined in the registers RTIMER0_G0[31:0] and RTIMER1_G0[31:0](for example, do not consider them, or jump out of the group G0 if a timing result is less than/equal to/greater than its reference value).

The action register RACTION_B #_G0[31:0] may further indicate the next branch event group to jump to. Or, the action register RACTION_B #_G0[31:0] may indicate to issue the debugging prompt 112 rather than jumping to another branch event group when the group jumping hap-pens.

The following table 1 lists the registers used in setting the branch event group G0.

TABLE 1

| register | description |
| --- | --- |
| RMDATA_B0_G0 | characteristics of branch event B0_G0, to be compared with a masked result of the sampled operational information DS |
| RMMASK_B0_G0 | mask for characteristics of branch event B0_G0 |
| RMDATA_B1_G0 | characteristics of branch event B1_G0, to be compared with a masked result of the sampled operational information DS |
| RMMASK_B1_G0 | mask for characteristics of branch event B1_G0 |
| RMDATA_B2_G0 | characteristics of branch event B2_G0, to be compared with a masked result of the sampled operational information DS |
| RMMASK_B2_G0 | mask for characteristics of branch event B2_G0 |
| RMDATA_B3_G0 | characteristics of branch event B3_G0, to be compared with a masked result of the sampled operational information DS |
| RMMASK_B3_G0 | mask for characteristics of branch event B3_G0 |
| RCNT0_G0 | the reference value for the counter counter0 used in the branch event group G0 |
| RCNT1_G0 | the reference value for the counter counter1 used in the branch event group G0 |
| RTIMER0_G0 | the reference value for the timer timer0 used in the branch event group G0 |
| RTIMER1_G0 | the reference value for the timer timer1 used in the branch event group G0 |
| RACTION_B0_G0 | action register for the branch event B0_G0 Bit [2:0] indicates actions in response to a system variable satisfying its reference value, wherein: 3'b111 means to generate the debugging prompt 112 ('b indicates that the following number is a binary number, and the number prior to 'b indicates the number of bits in the following binary number, the same below); 'h0 means to stay in the branch event group G0 ('h indicates that the following number is a hexadecimal number, the same below); 'h1 means to jump to the branch event group G1; 'h2 means to jump to the branch event group G2; 'h3 means to jump to the branch event group G3; Bit [6:5] describes how the counter counter0 operates in response to when the branch event B0_G0 has been matched, wherein: 2'b00 means not to change the counting result; 2'b01 means to increase the counting result; 2'b10 means to decrease the counting result; and 2'b11 means to reset the counting result. Bit [9:8] describes how to judge the counting result of the counter counter0, wherein: 2'b00 means to ignore the counting result; 2'b01 means to determine whether the counting result is smaller than its reference value; 2'b10 means to determine whether the counting result is equal to its reference value; and 2'b11 means to determine whether the counting result is greater than its reference value. Bit [12:11] describes how the counter counter1 operates in response to when the branch event B0_G0 has been matched, wherein: 2'b00 means not to change the counting result; 2'b01 means to increase the counting result; 2'b10 means to decrease the counting result; and 2'b11 means to reset the counting result. Bit [15:14] describes how to judge the counting result of the counter counter1, wherein: 2'b00 means to ignore the counting result; 2'b01 means to determine whether the counting result is smaller than its reference value; 2'b10 means to determine whether the counting result is equal to its reference value; and 2'b11 means to determine whether the counting result is greater than its reference value. Bit [18:17] describes how the timer timer0 operates in response to when the branch event B0_G0 has been matched, wherein: 2'b00 means not to change the timing result; 2'b01 means to start the timer timer0; 2'b10 means to stop the timer timer0; and 2'b11 means to clear (restart or reset) the timer timer0. Bit [22:21] describes how to judge the timing result obtained from the timer timer0, wherein: 2'b00 means to ignore the obtained timing result; 2'b01 means to determine whether the obtained timing result is smaller than its reference value; |

TABLE 1-continued

| register | description |
|----------|-------------|
| | 2'b10 means to determine whether the obtained timing result is equal to its reference value; and |
| | 2'b11 means to determine whether the obtained timing result is greater than its reference value. |
| | Bit [26:25] describes how the timer timer1 operates in response to when the branch event B0_G0 has been matched, wherein: |
| | 2'b00 means not to change the timing result; |
| | 2'b01 means to start the timer timer1; |
| | 2'b10 means to stop the timer timer1; and |
| | 2'b11 means to clear (restart or reset) the timer timer1. |
| | Bit [30:29] describes how to judge the timing result obtained from the timer timer1, wherein: |
| | 2'b00 means to ignore the obtained timing result; |
| | 2'b01 means to determine whether the obtained timing result is smaller than its reference value; |
| | 2'b10 means to determine whether the obtained timing result is equal to its reference value; and |
| | 2'b11 means to determine whether the obtained timing result is greater than its reference value. |
| RACTION_B1_G0 | action register for the branch event B1_G0, which is in the same format as RACTION_B0_G0 |
| RACTION_B2_G0 | action register for the branch event B2_G0, which is in the same format as RACTION_B0_G0 |
| RACTION_B3_G0 | action register for the branch event B3_G0, which is in the same format as RACTION_B0_G0 |

The remaining branch event groups G #are designed similarly.

The setting of the branch event groups G #can be varied in many ways. Each branch event group G #may manage a different number of branch events B #_G #. The system can use more counters and timers to monitor the system variables. Each branch event group G #may use different reference values to judge the counting results and the timing results of the counters and timers. For each branch event B #_G #, the operation and evaluation of the counters and timers may be more complex.

Figure 2:
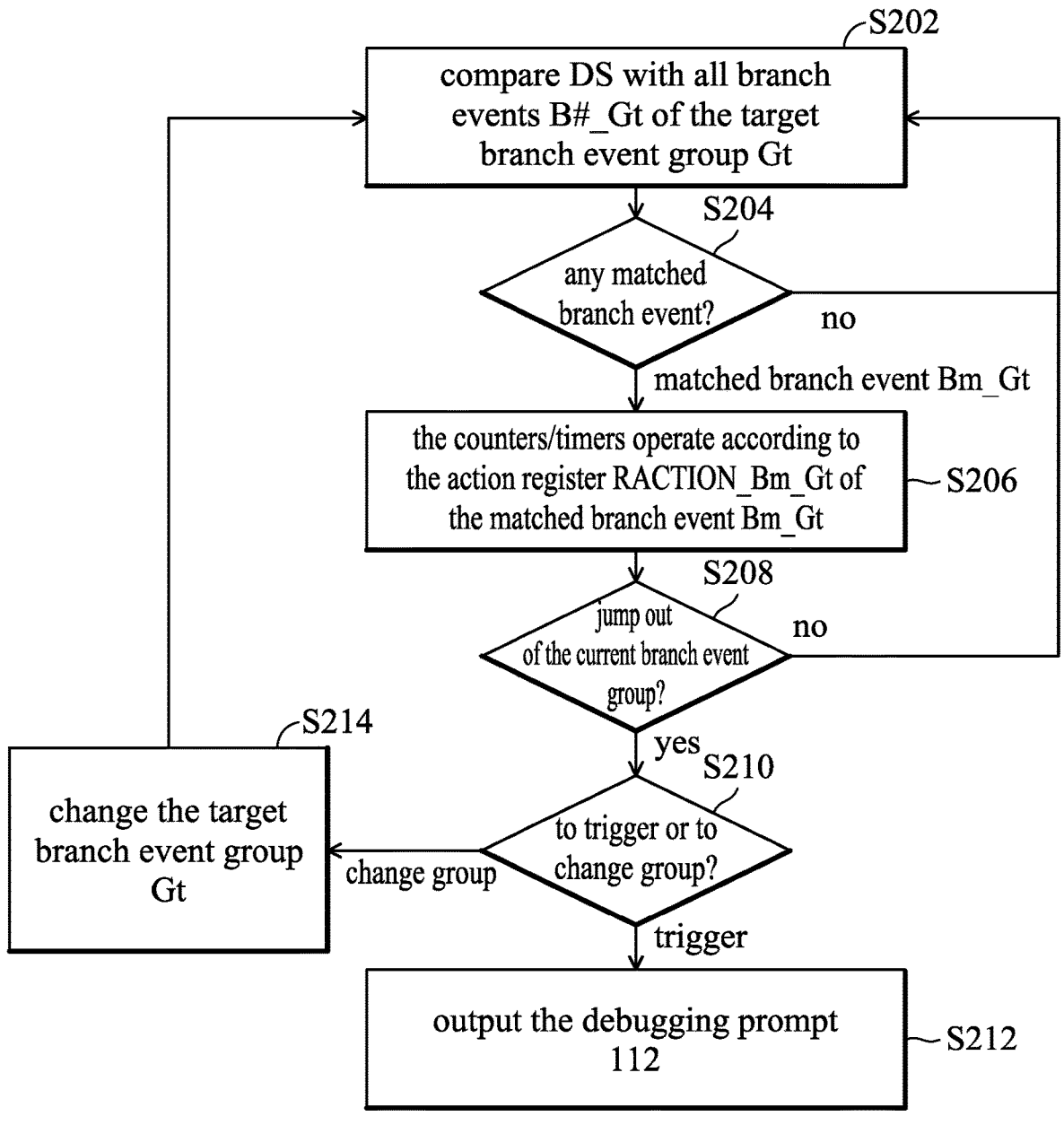
FIG. 2 is a flow chart, illustrating the trigger condition judgment implemented by the verification hardware 102 using the arithmetic module 106 in accordance with an exemplary embodiment of the disclosure.

FIG. 2 is a flow chart, illustrating the trigger condition judgment implemented by the verification hardware 102 using the arithmetic module 106 in accordance with an exemplary embodiment of the disclosure. According to actual needs, testers can first use software to set the registers corresponding to each branch event group G #, and select a branch event group as an initial branch event group (for example, G0). Then, the verification hardware 102 starts the trigger condition judgment from the initial branch event group (for example, G0) according to the process shown in FIG. 2.

In step S202, the sampled operational information DS is compared with all branch events B #_Gt of the target branch event group Gt (i.e., the branch event group checked currently). First, a bitwise AND operation is performed on the sampled operational information DS and each mask (RM-MASK_B #_Gt) of the different branch events B #_Gt defined in the target branch event group Gt, to generate bitwise AND results corresponding to the different branch events B #_Gt. Then, the bitwise AND result of each branch event is compared with the characteristics (RMDATA_B #_Gt) of each branch event B #_Gt.

In step S204, it is determined whether a matched branch event exists. Specifically, if there is at least one bitwise AND result is the same as the characteristics (RMDATA_B #_Gt) of the corresponding branch event B #_Gt, it means that there is a branch event matching the sampled operational information DS; otherwise, it means that there is no branch event matching the sampled operational information DS. If there is no matched branch event, the process returns to step S202 to continuously monitor whether the subsequent sampled operational information DS matches any branch event B #_Gt of the target branch event group Gt.

If it is determined in step S204 that there is a matched branch event Bm_Gt, the process proceeds to step S206. In step S206, according to the action register RACTION_Bm_Gt of the matched branch event Bm_Gt, the counters/timers operate. How the counters/timers change their counting/timing results, and how to judge these counting/timing results with respect to their reference values are defined in the action register RACTION_Bm_Gt (referring to Table 1 that shows the setting manner for operating and judging of the counters and the timers). Such judgment will be used in determining whether to jump out of the current branch event group (e.g., to change the target branch event group to another branch event group, or to determine that the branch-type trigger condition to start a debug procedure is met) or not. The relevant operations have been described previously and will not be repeated here.

In step S208, the arithmetic module 106 determines whether to jump out of the current branch event group. Specifically, the arithmetic module 106 determines whether to jump out of the current branch event group based on the setting of the action register of the matched branch event Bm_Gt (the actions are defined in Table 1). For example, if the current branch event group is G0 and the action is set to jump to G0 (RACTION_Bm_G0[2:0] is 'h0), it means there is no need to jump out of the current branch event group G0. Because the judgment result is that there is no need to jump out of the current branch event group (step S208 leads to "No"), the process returns to step S202, without changing the target branch event group Gt (which is G0 in this case), and continues to monitor whether any branch event in the target branch event group (G0) is matched. If step S208 leads to "yes" (the judgment result is to jump out of the current branch event group G0), through step S210, the procedure is led to a "trigger" state (RACTION_Bm_G0[2:0] is 3'b111), or a "group change" state (RACTION_Bm_G0[2:0] is 'h1, 'h2, or 'h3). Regarding the "trigger" state, the procedure proceeds to step S212 to operate the arithmetic module 106 to output the debugging prompt 112 for packaging. Regarding the "group change" state, the procedure proceeds to step S214 to change the target branch event group Gt. Then the procedure returns to step S202 to monitor the branch events B #_Gt in the new target branch event group Gt.

Under such a design, the branch-type trigger condition to start a debug procedure can be quite ingenious.

The following describes several examples about the trigger condition judgment implemented by the arithmetic module 106 of the verification hardware 102 on the chip 100 of the disclosure (based on the branch-type trigger condition defined in the registers 108).

In an exemplary embodiment, a branch-type trigger condition is satisfied if the following events happen in sequence: 1) a read request to read data at address 'h04; 2) a read request to read data at address 'h14, and the read data is 'hff; 3) a read request to read data at address 'h24. The sampled operational information DS not only show the read requests, but also show the read address in DS[15:0], and the read data in DS[31:16].

In this example, the branch event group G0 includes a branch event B0_G0 that corresponds to event 1 (a read request to read data at address 'h04), the characteristic register RMDATA_B0_G0[63:0] is set to 'h000000000-0000004, and the mask register RMMASK_B0_G0[63:0] is set to 'h000000000000ffff. The action register RACTION_B0_G0[2:0] is set to h'1, indicating that when jumping out of the branch group G0, the next branch event group is G1. The action register RACTION_B0_G0[6:5] is set to 'b01: when the branch event B0_G0 matches, the counter counter0 is incremented. The action register RACTION_B0_G0[9:8] is set to 'b10: when the counter counter0 is equal to its reference value RCNT0_G0 used in the branch event group G0, the procedure jumps out of the branch event group G0. The reference value RCNT0_G0 used in the branch event group G0 for the counter counter0 is set to 1.

The branch event group G1 includes a branch event B0_G1, corresponding to event 2 (a read request to read data at address 'h14, and the read data is 'hff). About the branch event B0_G1, the characteristic register RMDATA_B0_G1 [63:0] is set to 'h0000000000ff0014, and the mask register RMMASK_B0_G1[63:0] is set to 'h00000000ffffffff. The action register RACTION_B0_G1[2:0] is set to h'2, indicating that when jumping out of the branch event group G1, the next branch event group is G2. The action register RACTION_B0_G1[12:11] is set to 'b01: when the branch event B0_G1 matches, the counter counter1 is incremented. The action register RACTION_B0_G1[15:14] is set to 'b10: when the counter counter1 is equal to its reference value RCNT1_G1 used in the branch event group G1, the procedure jumps out of the branch event group G1. The reference value RCNT1_G1 used in the branch event group G1 for the counter counter1 is set to 1.

The branch event group G2 includes a branch event B0_G2, corresponding to event 3 (a read request to read data at address 'h24), the characteristic register RMDATA_B0_G2[63:0] is set to 'h0000000000000024, and the mask register RMMASK_B0_G2[63:0] is set to 'h000000000000ffff. The action register RACTION_B0_G2 [2:0] is set to 3'b111, indicating that when jumping out of the branch event group G2, the procedure issues the debugging prompt 112 to represent that the branch-type trigger condition is met. The action register RACTION_B0_G2[6: 5] is set to 'b01: when the branch event B0_G2 matches, the counter counter0 is incremented. The action register RACTION_B0_G2[9:8] is set to 'b10: when the counter counter0 is equal to its reference value RCNT0_G2 used in the branch event group G2, the procedure jumps out of the branch event group G2. The reference value RCNT0_G2 used in the branch event group G2 for the counter counter0 is set to 2.

In this way, when the events 1, 2, and 3 occur sequentially, the arithmetic module 106 sequentially finds the matched branch events in the branch event groups G0, G1, and G2, confirms that the branch-type trigger condition is met, and generates the debugging prompt 112. The above design does not consider the time interval between events. There may be other events between the monitored events, but it does not affect the generation of the debugging prompts 112.

In an exemplary embodiment, a branch-type trigger condition is satisfied if the following events happen in sequence: 1) a read request to read data at address 'h04; 2) a read request to read data at address 'h14. In particular, event 2 should occur within 1 ms (millisecond) of event 1. The sampled operational information DS shows the read requests, and DS[15:0] shows the read address.

In this example, the branch event group G0 includes a branch event B0_G0 that corresponds to event 1 (a read request to read data at address 'h04), the characteristic register RMDATA_B0_G0[63:0] is set to 'h0000000-000000004, and the mask register RMMASK_B0_G0[63:0] is set to 'h000000000000ffff. The action register RACTION_B0_G0[2:0] is set to h'1, indicating that when jumping out of group G0, the next branch event group is G1. The action register RACTION_B0_G0[6:5] is set to 'b01: when the branch event B0_G0 matches, the counter counter0 is incremented. The action register RACTION_B0_G0[9:8] is set to 'b10: when the counter counter0 is equal to its reference value RCNT0_G0 used in the branch event group G0, the procedure jumps out of the branch event group G0. The reference value RCNT0_G0 used in the branch event group G0 for the counter counter0 is set to 1. The action register RACTION_B0_G0[18:17] is set to 'b01; when the branch event B0_G0 matches, the timer timer0 starts timing.

The branch event group G1 includes a branch event B0_G1, corresponding to event 2 (a read request to read data address 'h14), the characteristic register RMDATA_B0_G1 [63:0] is set to 'h0000000000000014, and the mask register RMMASK_B0_G1[63:0] is set to 'h000000000000ffff. The action register RACTION_B0_G1[2:0] is set to 'b111, indicating that when jumping out of group G1, a debugging prompt 112 is generated to show that the branch-type trigger condition is met. The action register RACTION_B0_G1[22: 21] is set to 'b10: when the timer timer0 is less than the reference value RTIMER0_G1 used in the branch event group G1, the procedure jumps out of branch event group G1. The reference value RTIMER0_G1 used in the branch event group G1 for the timer timer0 is set to 1 ms.

In this way, when events 1 and 2 occur sequentially, the arithmetic module 106 sequentially finds the matched branch events in the branch event groups G0 and G1, confirms that event 2 occurs within 1 ms of event 1, and outputs the debugging prompt 112.

In an exemplary embodiment, a branch-type trigger condition is satisfied if the following events happen in sequence: 1) a read request to read data at address 'h04; 2) another read request to read data at address 'h04; and 3) a read request to read data at address 'h14. In particular, event 2 should occur within 1 ms of event 1. The sampled operational information DS shows the read requests, and DS[15:0] shows the read address.

In this example, the branch event group G0 includes a branch event B0_G0 that corresponds to events 1 and 2 (two read requests to read data at address 'h04), the characteristic register RMDATA_B0_G0[63:0] is set to 'h000000-0000000004, and the mask register RMMASK_B0_G0[63:0] is set to 'h000000000000ffff. The action register RACTION_B0_G0[2:0] is set to 'h01, indicating that when jumping out of the branch event group G0, the next branch event group is G1. The action register RACTION_B0_G0[6:5] is set to 'b01: when the branch event B0_G0 matches, the counter counter0 is incremented. The action register RACTION_B0_G0[9:8] is set to 'b10: when the counter counter0 is equal to its reference value RCNT0_G0 used in the branch event group G0, the procedure jumps out of the branch event group G0. The reference value RCNT0_G0 used in the branch event group G0 for the counter counter0 is set to 2. The action register RACTION_B0_G0[18:17] is set to 'b01: when the branch event B0_G0 matches, the timer timer0 starts timing. The action register RACTION_B0_G0[22:21] is set to 'b10: when the timer timer0 is less than its reference value RTIMER0_G0 used in the branch event group G0, the procedure jumps out of branch event group G0. The reference value RTIMER0_G0 used in the branch event group G0 for the timer timer0 is set to 1 ms.

The branch event group G1 includes a branch event B0_G1 that corresponds to event 3 (a read request to read data at address 'h14). The characteristic register RMDATA_B0_G1[63:0] is set to 'h0000000000000014, and the mask register RMMASK_B0_G1[63:0] is set for 'h000000000000ffff. The action register RACTION_B0_G1 [2:0] is set to 'b111, indicating that when jumping out of group G1, a debugging prompt 112 is generated to show that the branch-type trigger condition is met. The action register RACTION_B0_G1[12:11] is set to 'b01: when the branch event B0_G1 matches, the counter counter1 is incremented. The action register RACTION_B0_G1[15:14] is set to 'b10: when the counter counter1 is equal to its reference value RCNT1_G1 used in the branch event group G1, the procedure jumps out of the branch event group G1. The reference value RCNT1_G1 used in the branch event group G1 to judge the counter counter1 is set to 1.

In this way, when events 1, 2 and 3 occur sequentially, the arithmetic module 106 finds a matched branch event twice (within the predetermined time limit between event 1 and event 2) from the branch event group G0, and then finds another matched branch event from the branch event group G1 (event 3). Thus, the arithmetic module 106 confirms that the branch-type trigger condition is met, and outputs the debugging prompt 112.

In an exemplary embodiment, the branch-type trigger condition includes the sequential occurrence of: 1-1) an input and output (IO) read request at address 'h04, or 1-2) a memory write request at address 'h05; 2) a read request at address 'h14, and the read data is 'hff; and 3) a read request at address 'h24. The sampled operational information DS shows the read/write requests, DS[15:0] shows the read address, DS[31:16] shows the read data, DS[47:32] shows the IO read address, and DS[63:48] shows the memory write address.

In this example, the branch event group G0 includes a branch event B0_G0, corresponding to event 1-1 (the IO read request at address 'h04), whose characteristic register RMDATA_B0_G0[63:0] is 'h0000000400000000, and mask register RMMASK_B0_G0[63:0] is 'h0000ffff-00000000. The action register RACTION_B0_G0[2:0] is set to 'h1, indicating that when jumping out of the branch group G0, the next branch event group is G1. The action register RACTION_B0_G0[6:5] is set to 'b01: when the branch event B0_G0 matches, the counter counter0 is incremented. The action register RACTION_B0_G0[9:8] is set to 'b10: when the counter counter0 is equal to its reference value RCNT0_G0 used in the branch event group G0, the procedure jumps out of the branch event group G0. The reference value RCNT0_G0 used in the branch event group to judge the counter counter0 is 1.

The branch group G0 further includes a branch event B1_G0 corresponding to event 1-2 (a memory write request at address 'h05). The characteristic register RMDATA_B1_G0[63:0] is 'h0005000000000000, and mask register RMMASK_B1_G0[63:0] is 'hffff000000000000. The action register RACTION_B1_G0[2:0]s set to'h1, indicating that when jumping out of the branch event group G0, the next branch event group is G1. The action register RACTION_B1_G0[6:5] is set to 'b01: when the branch event B1_G0 matches, the counter counter0 is incremented. The action register RACTION_B1_G0[9:8] is set to 'b10: when the counter counter0 is equal to its reference value RCNT0_G0 used in the branch event group G0, the procedure jumps out of the branch event group G0. As mentioned above, the reference value RCNT0_G0 used in the branch event group G0 to judge the counter counter0 is 1.

The branch event group G1 includes a branch event B0_G1 corresponding to event 2 (a read request at address 'h14, and the read data is 'hff). The characteristic register RMDATA_B0_G1[63:0] is 'h0000000000ff0014, and the mask register RMMASK_B0_G1[63:0] is 'h00000000ffffffff. The action register RACTION_B0_G1 [2:0] is h'2, indicating that when jumping out of the branch event group G1, the next branch event group is G2. The action register RACTION_B0_G1[12:11] is set to 'b01: when the branch event B0_G1 matches, the counter counter1 is incremented. The action register RACTION_B0_G1[15:14] is set to 'b10: when the counter counter1 is equal to its reference value RCNT1_G1 used in the branch event group G1, the procedure jumps out of the branch event group G1. The reference value RCNT1_G1 used in the branch event group G1 to judge the counting result of the counter counter1 is 1.

The branch event group G2 includes a branch event B0_G2, corresponding to event 3 (a read request at address 'h24). The characteristic register RMDATA_B0_G2[63:0] is set to 'h0000000000000024, and the mask register RMMASK_B0_G2[63:0] is set to 'h000000000000ffff. The action register RACTION_B0_G2[2:0] is set to 'b111, indicating that when jumping out of group G2, a debugging prompt 112 is generated to show that the branch-type trigger condition is met. The action register RACTION_B0_G2[6:5] is set to 'b01: when the branch event B0_G2 matches, the counter counter0 is incremented. The action register RACTION_B0_G2[9:8] is set to 'b10: when the counter counter0 is equal to its reference value RCNT0_G2 used in the branch event group G2, the procedure jumps out of the branch event group G2. The reference value RCNT0_G2 used in the branch event group G2 to judge the counting result of the counter counter0 is set to 2.

In this way, when event 1 (1-1 or 1-2), event 2, and event 3 occur sequentially, the arithmetic module 106 finds the matched branch events from the branch event groups G0, G1 and G2 in sequence, confirms that the branch-type trigger condition is met, and outputs the debugging prompt 112. It should be noted that in this example, as long as one of the events 1-1 and 1-2 occurs, the procedure proceeds to the checking of the subsequent event. The branch-type trigger condition monitored to start a debug procedure can be more flexible.

Figure 3:
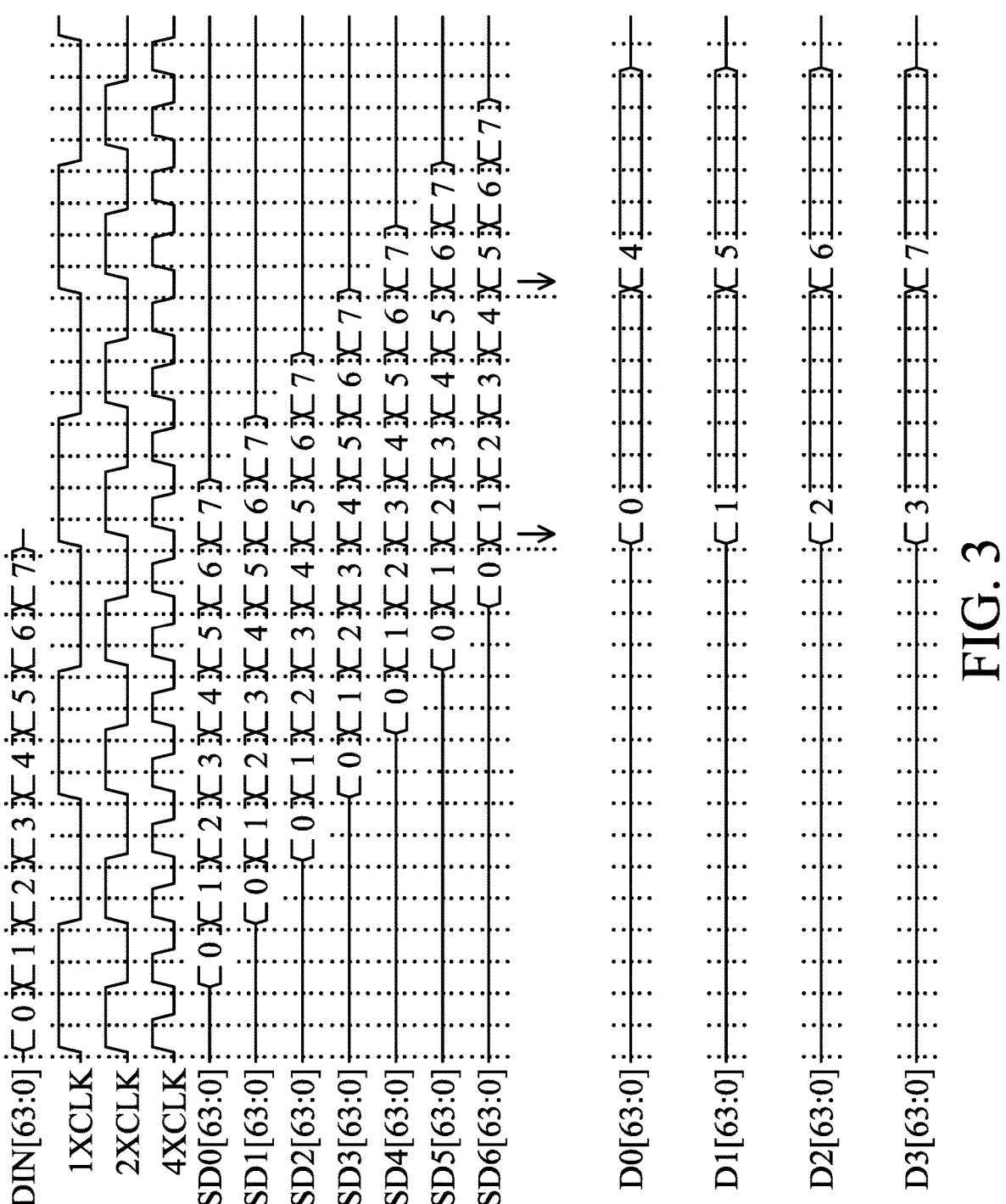
FIG. 3 illustrates waveforms of signals related to the sampling module 104.
Figure 4:
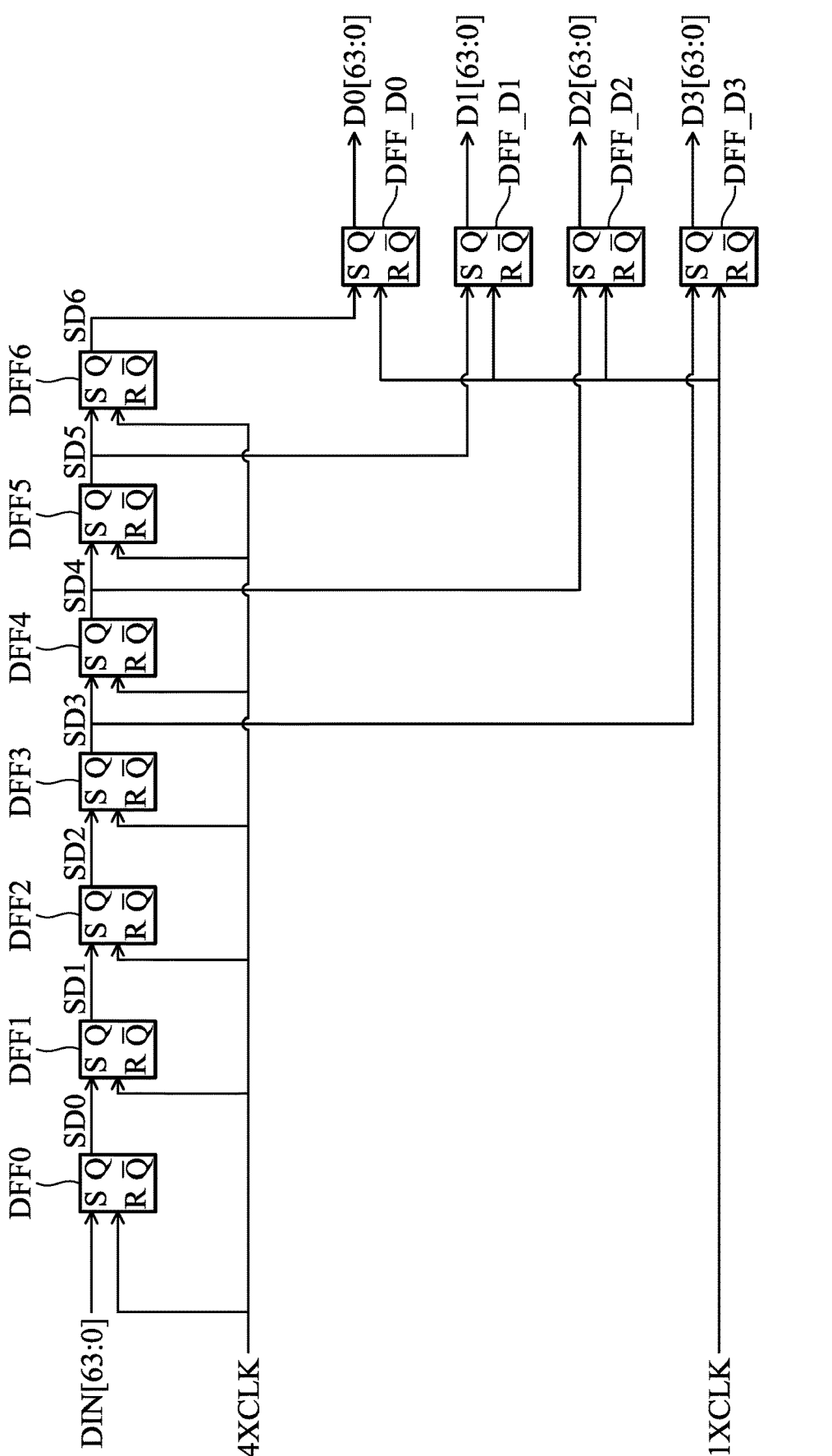
FIG. 4 illustrates the detailed circuit of the sampling module 104 in accordance with an exemplary embodiment of the disclosure.

FIG. 3 illustrates waveforms of signals related to the sampling module 104, and FIG. 4 illustrates the detailed circuit of the sampling module 104 in accordance with an exemplary embodiment of the disclosure. In the following, with reference to FIGS. 1, 3, and 4, how the sampling module 104 realizes a sampling rate of a quadruple-frequency clock 4×CLK is introduced.

The verification hardware 102 in FIG. 1 operates based on one-times frequency clock 1×CLK (e.g., 1 GHz), but uses the rising edges and falling edges of a double-frequency clock 2×CLK (e.g., 2 GHz) to implement the quadruple-frequency clock 4×CLK (e.g., 4 GHz) for information sampling.

Since no static timing analysis (STA) is performed on the quadruple-frequency clock 4×CLK and the sampling target (i.e., the operational signal DIN[63:0]), there may be a metastable problem. According to the quadruple-frequency clock 4×CLK, the sampling may be performed in the transition period of the operational information DIN[63:0]. In this disclosure, a multi-stage D flip-flop (DFF) architecture is proposed to solve this metastable problem. There is no logic circuit between the DFFs, which guarantees correct sampling at each stage.

As shown in FIG. 3, the operational information DIN[63:0] decoded according to a double-frequency clock 2×CLK contains data 0 . . . 7. The quadruple-frequency clock 4×CLK is formed based on the rising edges and falling edges of the double-frequency clock 2×CLK. After being processed by the D flip-flop DFF0 that operates according to the quadruple-frequency clock 4×CLK, the operational information DIN[63:0] is transformed into a signal SD0[63:0]. After being processed by the D flip-flop DFF1 that operates according to the quadruple-frequency clock 4×CLK, the signal SD0[63:0] is transformed into a signal SD1[63:0]. After being processed by the D flip-flop DFF2 that operates according to the quadruple-frequency clock 4×CLK, the signal SD1[63:0] is transformed into a signal SD2[63:0]. After being processed by the D flip-flop DFF3 that operates according to the quadruple-frequency clock 4×CLK, the signal SD2[63:0] is transformed into a signal SD3[63:0]. After being processed by the D flip-flop DFF4 that operates according to the quadruple-frequency clock 4×CLK, the signal SD3[63:0] is transformed into a signal SD4[63:0]. After being processed by the D flip-flop DFF5 that operates according to the quadruple-frequency clock 4×CLK, the signal SD4[63:0] is transformed into a signal SD5[63:0]. After being processed by the D flip-flop DFF6 that operates according to the quadruple-frequency clock 4×CLK, the signal SD5[63:0] is transformed into a signal SD6[63:0]. Such a multi-stage DFF architecture (DFF0-DFF6) solve the metastable problem caused by sampling DIN by 4×CLK. The signals SD #are more and more reliable. The sampled operational information DS can be correctly obtained from the signals SD #.

In an exemplary embodiment, the signals SD6[63:0], SD5[63:0], SD4[63:0], and SD3[63:0] are further sampled based on the one-times frequency clock 1×CLK, to obtain signals DO[63:0], D1 [63:0], D2[63:0], and D3[63:0] in parallel. For example, the signals D0 . . . D3 first show data 0 . . . 3 of the operational information DIN[63:0] in parallel, and then show data 4 . . . 7 of the operational information DIN[63:0] in parallel. The aforementioned sampled operational information DS is obtained from the signals D0 . . .

D3, and every time four batches of sampled operational information DS are obtained in parallel.

FIG. 4 illustrates the detailed circuit of the sampling module 104 in accordance with an exemplary embodiment of the disclosure. The DFFs are implemented by SR latches.

The D flip-flop DFF0 has an S input terminal receiving the operational information DIN[63:0], and a Q output terminal outputting the signal SD0[63:0]. The D flip-flop DFF1 has an S input terminal receiving the signal SD0[63:0], and a Q output terminal outputting the signal SD1[63:0]. The D flip-flop DFF2 has an S input terminal receiving the signal SD1[63:0], and a Q output terminal outputting the signal SD2[63:0]. The D flip-flop DFF3 has an S input terminal receiving the signal SD2[63:0], and a Q output terminal outputting the signal SD3[63:0]. The D flip-flop DFF4 has an S input terminal receiving the signal SD3[63:0], and a Q output terminal outputting the signal SD4[63:0]. The D flip-flop DFF5 has an S input terminal receiving the signal SD4[63:0], and a Q output terminal outputting the signal SD5[63:0]. The D flip-flop DFF6 has an S input terminal receiving the signal SD5[63:0], and a Q output terminal outputting the signal SD6[63:0]. The metastable problem can be solved by the three D flip-flops DFF1 . . . DFF3 which are connected in series without any other logic components between them.

FIG. 4 further show parallel sampling D flip-flops DFF_D0 . . . DFF_D3 operate according to the one-times frequency clock 1×CLK, which sample the signals SD6[63: 0] . . . SD3[63:0], respectively. The parallel sampling D flip-flop DFF_D0 has an S input terminal receiving the signal SD6[63:0], and a Q output terminal outputting the signal D0[63:0]. The parallel sampling D flip-flop DFF_D1 has an S input terminal receiving the signal SD5[63:0], and a Q output terminal outputting the signal D1[63:0]. The parallel sampling D flip-flop DFF_D2 has an S input terminal receiving the signal SD4[63:0], and a Q output terminal outputting the signal D2[63:0]. The parallel sampling D flip-flop DFF_D3 has an S input terminal receiving the signal SD3[63:0], and a Q output terminal outputting the signal D3[63:0]. The parallel sampling D flip-flops DFF_D0 . . . DFF_D3 realize a serial-to-parallel conversion.

In an exemplary embodiment, only the D flip-flops DFF0 . . . DFF6 connected in series in the sampling module 104 use the quadruple-frequency clock 4×CLK, and the high-frequency clock 4×CLK does not involve other logical operations. The arithmetic module 106 does not need to have high computing capability.

The arithmetic module 106 still uses the one-times frequency clock 1×CLK to perform the trigger condition judgment. In an exemplary embodiment, to process the four batches of data retrieved from the signals D0[63:0] . . . D3[63:0] in parallel, the arithmetic module 106 sequentially performs four times of branch event matching (to determine whether to jump out of the current branch event group or not) within a time period 1T.

An optimized scheme for trigger condition judgment is shown in this disclosure. Referring to FIG. 3, four batches of data, data0 . . . data3, are retrieved from the signals D0[63:0] . . . D3[63:0] in parallel in the first time period, and four batches of data, data4 . . . data7, are retrieved from the signals D0[63:0] . . . D3[63:0] in parallel in the second time period. The data 0 . . . 7 is the sampled operational information DS mentioned above. In an example, the branch-type trigger condition involves four branch event groups, and each branch event group includes four branch events. The total number of branch events is 16 (4×4). The data data0 . . . data3 retrieved in parallel each is compared with every branch event of all branch event groups (16 branch events in total), and thereby 16-bit matching records data0_WPUSH . . . data3_WPUSH are generated for the data data0 . . . data3, respectively. In the matching records data0_WPUSH . . . data3_WPUSH, "0" means that the sampled operational information data #does not match the corresponding branch event, and "1" means that the sampled operational information data #matches the corresponding branch event. Similarly, the data data4 . . . data7 retrieved in parallel each is compared with every branch event of all branch event groups, and thereby 16-bit matching records data4_WPUSH . . . data7_WPUSH are generated for the data data4 . . . data7, respectively. Only the non-zero matching records data #_WPUSH are cached for analysis. In this way, not every data retrieved from the signals D0[63:0] . . . D3[63:0] needs to be analysis. If no branch event is matched, the subsequent analysis can be omitted.

In an exemplary embodiment, the matching record data #_WPUSH includes data #_WPUSH[3:0], data #_WPUSH [7:4], data #_WPUSH[11:8] and data #_WPUSH[15:12]. The data #_WPUSH[3:0] shows matching status between the sampled operational information DS and the branch events of the branch event group G0. The data #_WPUSH[0] shows whether the sampled operational information DS matches the branch event B0 of the branch event group G0. Data #_WPUSH[1] shows whether the sampled operational information DS matches the branch event B1 of the branch event group G0. Data #_WPUSH[2] shows whether the sampled operational information DS matches the branch event B2 of the branch event group G0.Data #_WPUSH[3] shows whether the sampled operational information DS matches the branch event B3 of the branch event group G0. Similarly, data #_WPUSH[7:4] stores matching status between the sampled operational information DS and the branch events of the branch event group G1. Data #_WPUSH[11:8] stores matching status between the sampled operational information DS and the branch events of the branch event group G2. And data #_WPUSH[15:12] stores matching status between the sampled operational information DS and the branch events of the branch event group G3. For example, when data0_WPUSH is b0000000000000001, it means that the sampled operational information data0 only matches the branch event B0 of the branch event group G0 (irrelevant to the other branch events in the branch event groups G0-G3). When data0_WPUSH is b0000000000100000, it means that the sampled operational information data0 only matches the branch event B1 of the branch event group G1 (irrelevant to the other branch events in the branch event groups G0-G3).

Figure 5:
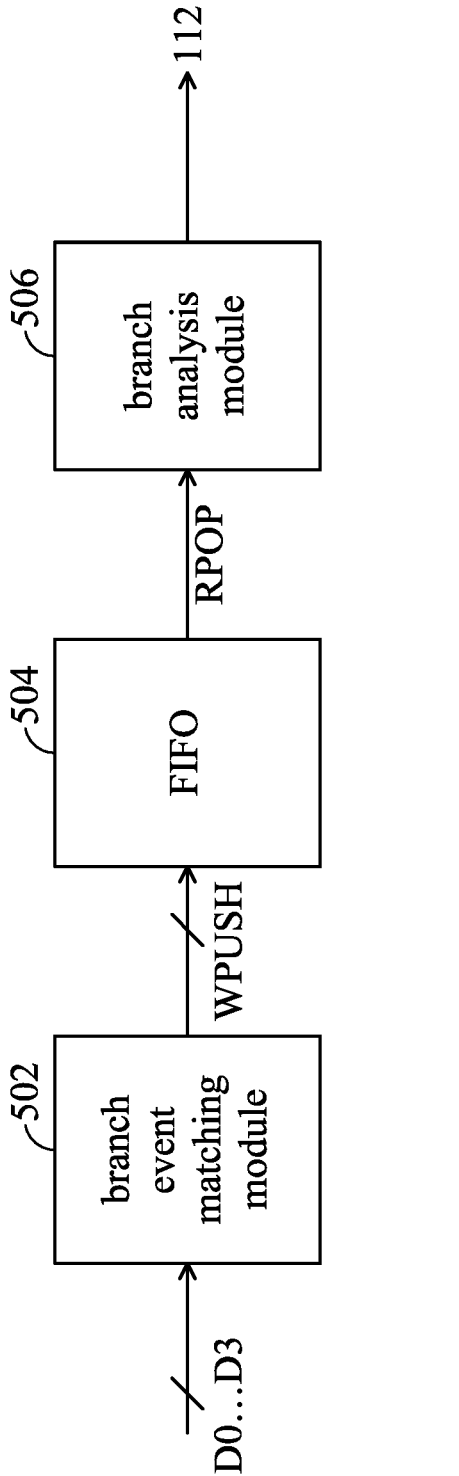
FIG. 5 illustrates an optimization solution of the arithmetic module 106 in accordance with an exemplary embodiment of the disclosure.

FIG. 5 illustrates an optimization solution of the arithmetic module 106 in accordance with an exemplary embodiment of the disclosure. The arithmetic module 106 may include a branch event matching module 502, a first-in-first-out buffer (FIFO) 504, and a branch analysis module 506. The four batched of sampled operation information (such as data0 . . . data3) obtained from D0 . . . D3 in parallel are compared with all branch events through the branch event matching module 502, to generate 16-bit matching records (such as data0_WPUSH . . . data3_WPUSH) for each sampled operational information DS. The non-zero matching record WPUSH is stored into the first-in-first-out (FIFO) buffer 504 for subsequent branch analysis. The matching records RPOP successively retrieved from the first-in-first-out buffer 504 are processed by branch analysis module 506. Once the branch-type trigger condition is met, the branch analysis module 506 outputs the debugging prompt 112.

Figure 6:
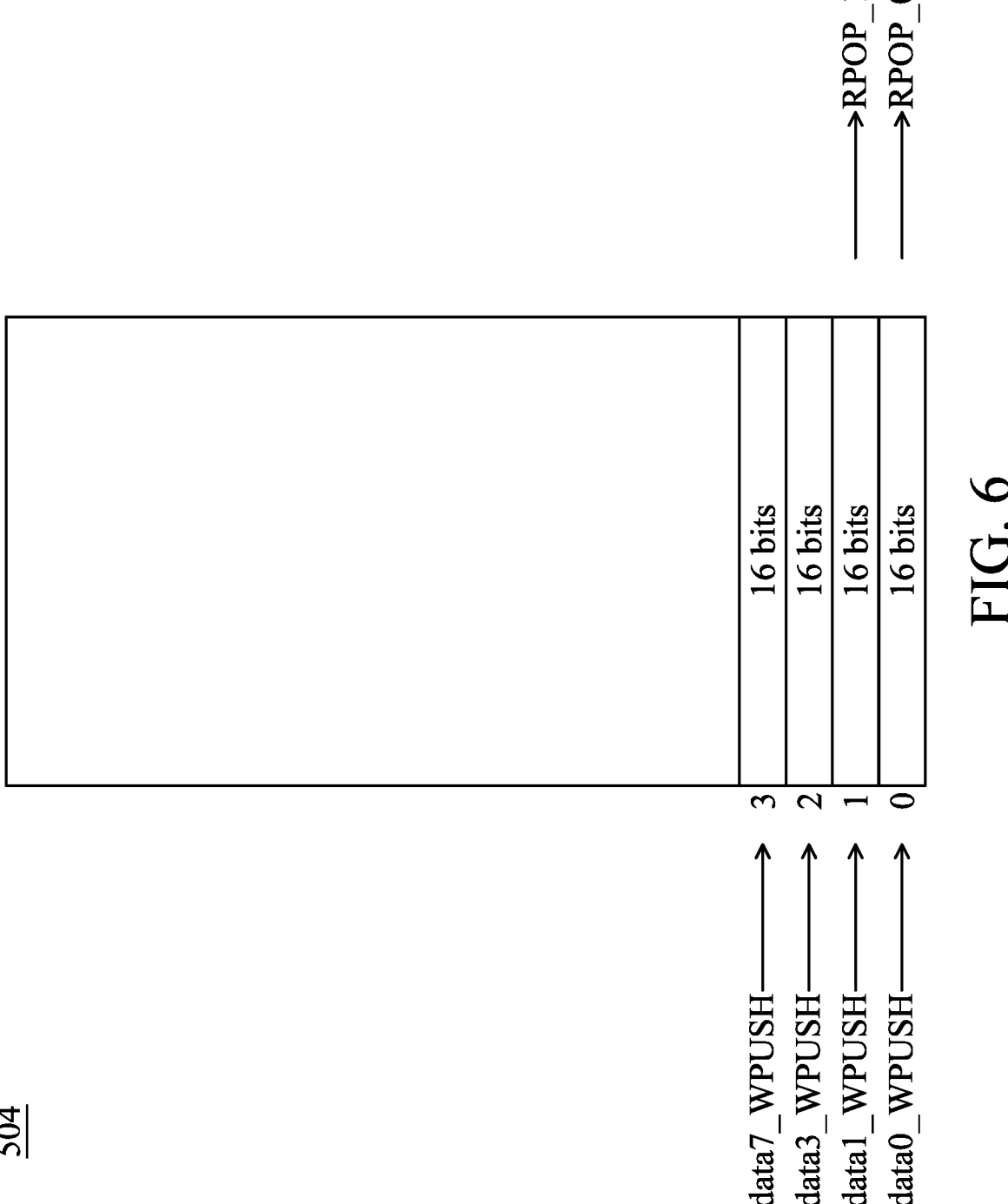
FIG. 6 illustrates the first-in-first-out buffer 504 whose size is 32×16 bits.

FIG. 6 illustrates the first-in-first-out buffer 504. In the exemplary embodiment shown in FIG. 6, the first-in first-out buffer 504 has a size of 32×16 bits and can store 32 matching records (data #_WPUSH). In the illustrated example, among the data data0 . . . data3 (retrieved, in parallel, from D0[63:0] . . . D3[63:0] in the first cycle) and data4 . . . data7 (retrieved, in parallel, from D0[63:0] . . . D3[63:0] in the second cycle), there are only four non-zero matching records data0_WPUSH, data1_WPUSH, data3_WPUSH, and data7_WPUSH, which are pushed into the first-in-first-out buffer 504. They can be read out in pairs (RPOP_0 and RPOP1) later to be processed by the branch analysis module 506.

Figure 7:
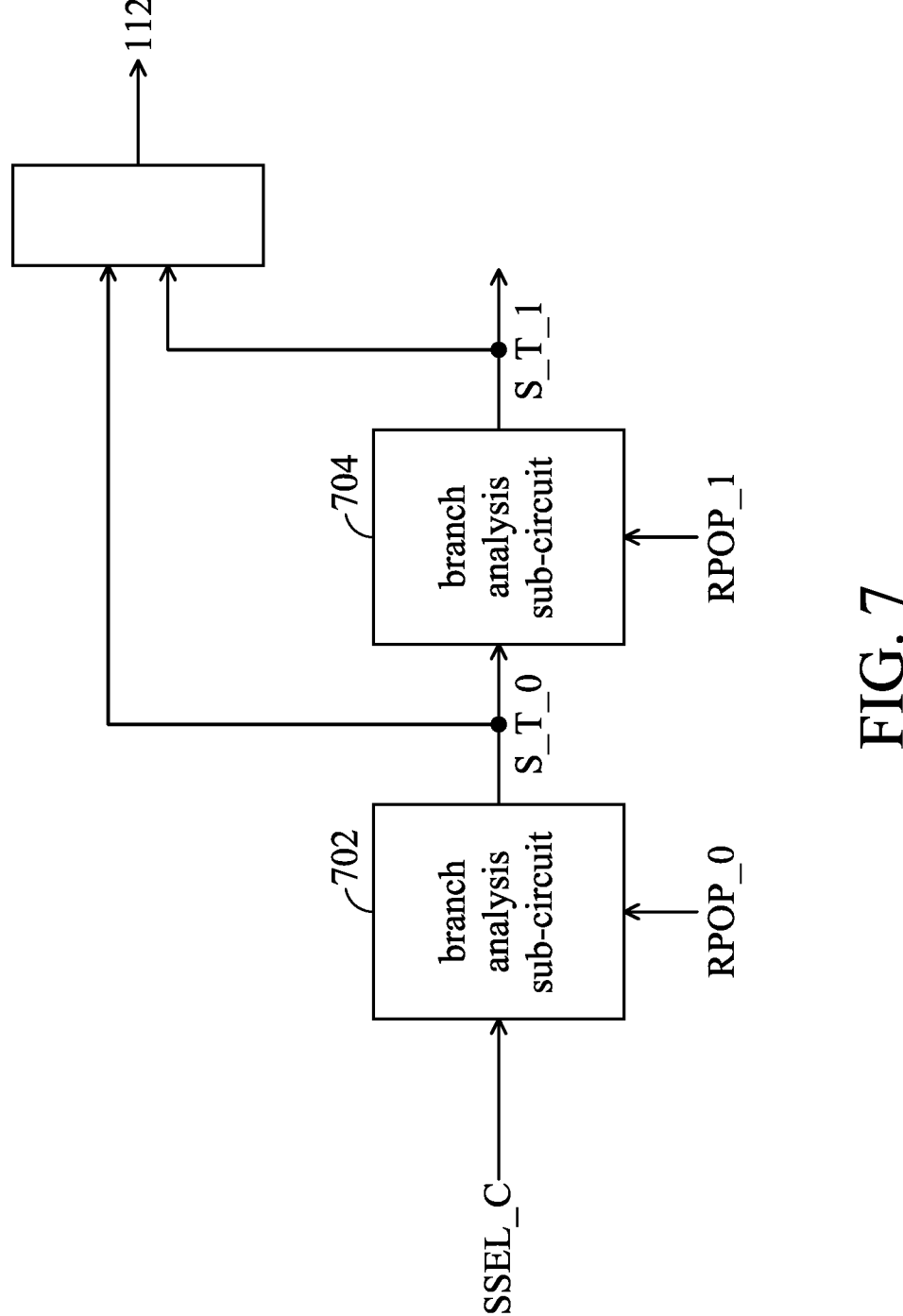
FIG. 7 illustrates an exemplary embodiment of the branch analysis module 506, wherein, to process the matching records RPOP_0 and RPOP1 taken out from the first-in-first-out buffer 504 in pairs, branch analysis sub-circuits 702 and 704 (in the same structure and cascaded to form a two-stage architecture) are provided.

FIG. 7 illustrates an exemplary embodiment of the branch analysis module 506. To process the matching records RPOP_0 and RPOP1 taken out from the first-in-first-out buffer 504 in pairs, branch analysis sub-circuits 702 and 704 (having the same structure and cascaded to form a two-stage architecture) are provided. The branch analysis sub-circuit 702 operates based on the matching record RPOP_0 and the current branch event group setting SSEL_C, so that the branch analysis is performed on the matched branch events in the current branch event group (SSEL_C).

The branch analysis sub-circuit 702 uses the signal S_T_0 to indicate whether to jump out of the current branch event group or not, or whether the branch-type trigger condition is satisfied. If the branch-type trigger condition is met, the signal S_T_0 is for generation of the debugging prompt 112. If the branch-type trigger condition is not met, the signal S_T_0 carries the next branch event group setting, which will be used to operate the branch analysis sub-circuit 704 of the next stage. The branch analysis sub-circuit 704 operates according to the matching record RPOP_1 and the next branch event group setting carried in the signal S_T_0. The branch analysis sub-circuit 704 uses the signal S_T_1 to indicate whether to jump out of its branch event group or not, or whether the branch-type trigger condition is satisfied. If the branch-type trigger condition is satisfied is met, the signal S_T_1 is for generation of the debugging prompt 112. If the branch-type trigger condition is satisfied is not met, the signal S_T_1 carries the next branch event group setting, which will be used as the branch event group setting SSEL_C for the branch analysis of the next pair of matching records RPOP_0 and RPOP1.

Figure 8:
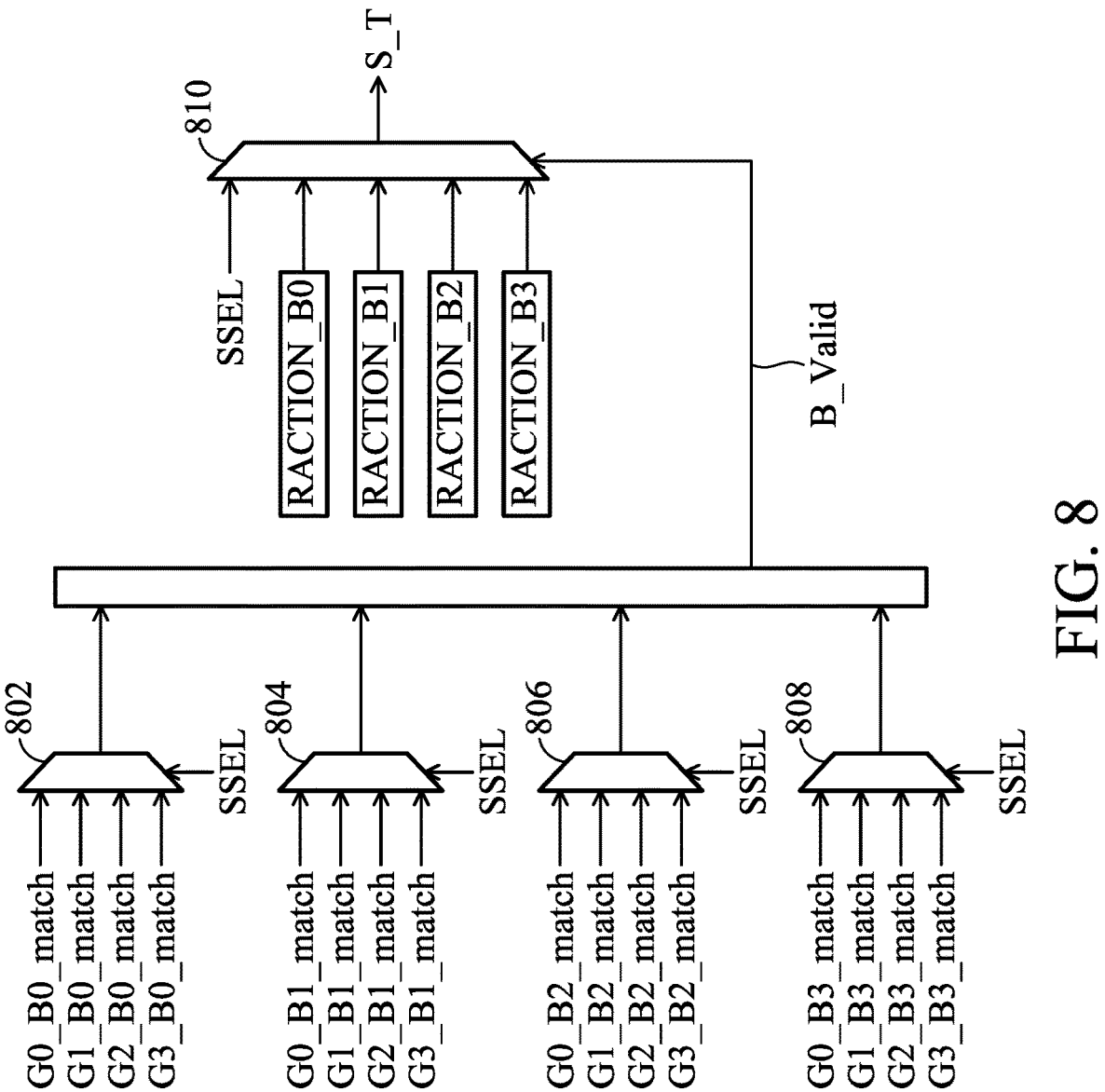
FIG. 8 illustrates the details of the branch analysis sub-circuit 702 (same structure as 704)

FIG. 8 illustrates the details of the branch analysis sub-circuit 702 (same structure as 704). Regarding the matching record RPOP_0, the record bits for the different branch events (B #) of the different branch event groups (G #) are represented as G #_B #_match. The branch event group setting SSEL is used as group selection signal to control the multiplexers 802, 804, 806, and 808. Accordingly, the branch analysis is focused on the target branch event group Gt. As shown, the multiplexers 802, 804, 806, and 808 each correspond to a branch event number; wherein multiplexer 802 corresponds to the branch event number B0, multiplexer 804 corresponds to the branch event number B1, and multiplexer 806 corresponds to the branch event number B2, and the multiplexer 808 corresponds to the branch event number B3. The same multiplexer receives record bits of the same branch event number in the different branch event groups G0-G3. The multiplexers 802, 804, 806, and 808 all operate according to the branch event group setting SSEL (Gt). The outputs of the multiplexers 802, 804, 806, and 808 are transformed into a valid symbol B_Valid that indicates the valid matching bit. The valid symbol B_Valid shows the matched branch event of the target branch event group Gt. The action modules RACTION_B0 . . . RACTION_B3 each correspond to a branch event number B #, and provide an action prediction based on the corresponding action registers RACTION_B #_Gt related to the branch event group setting SSEL (Gt), to predict whether to jump to another branch event group or not, or whether to trigger the debugging prompt 112. The multiplexer 810 (also known as an action multiplexer) receives the branch event group setting SSEL (Gt) as well as the action predictions provided by the different action modules RACTION_B0 . . . RACTION_B3, to output an action indication S_T in response to the valid symbol B_Valid that indicates the valid matching bit. The action indication S_T indicates whether to stay in the current branch event group (SSEL), jump to another branch event group, or trigger the debugging prompt 112. In an exemplary embodiment, the valid symbol B_Valid includes 4 bits, and each bit corresponds to a branch event group. When every bit in the valid symbol B_Valid is 0, it means to stay in the current branch event group. For example, if B_Valid[3:0] is 4'b0000, it means to stay in the current branch event group (810 outputs SSEL). If B_Valid[3:0] is 4'b0001, it means to change the branch event group setting Gt and jump to the branch event group G0. If B_Valid[3:0] is 4'b0010, it means to change the branch event group setting Gt and jump to the branch event group G1. If B_Valid[3:0] is 4'b0100, it means to change the branch event group setting Gt and jump to the branch event group G2. If B_Valid[3:0] is 4'b1000, it means to change the branch event group setting Gt and jump to the branch event group G3. In another exemplary embodiment, the valid symbol B_Valid is a 3-bit signal, representing different options by the different values. For example, if B_Valid[2:0] is 0, it means to stay in the current branch event group (810 outputs SSEL). If B_Valid[2:0] is 1, it means to change the branch event group setting Gt and jump to the branch event group G0. If B_Valid[2:0] is 2, it means to change the branch event group setting Gt and jump to the branch event group G1. If B_Valid[2:0] is 3, it means to change the branch event group setting Gt and jump to the branch event group G2. If B_Valid[2:0] value is 4, it means to change the branch event group setting Gt and jump to the branch event group G3. In short, this application does not limit the specific implementation form of the valid symbol B_Valid.

The action module RACTION_B0 corresponds to the branch analysis logics of the same branch event number B0 in the different branch event groups G0 . . . G3. The action module RACTION_B1 corresponds to the branch analysis logics of the same branch event number B1 in the different branch event groups G0 . . . G3. The action module RACTION_B2 corresponds to the branch analysis logics of the same branch event number B2 in the different branch event groups G0 . . . G3. The action module RACTION_B3 corresponds to the branch analysis logics of the same branch event number B3 in the different branch event groups G0 . . . G3.

Figure 9:
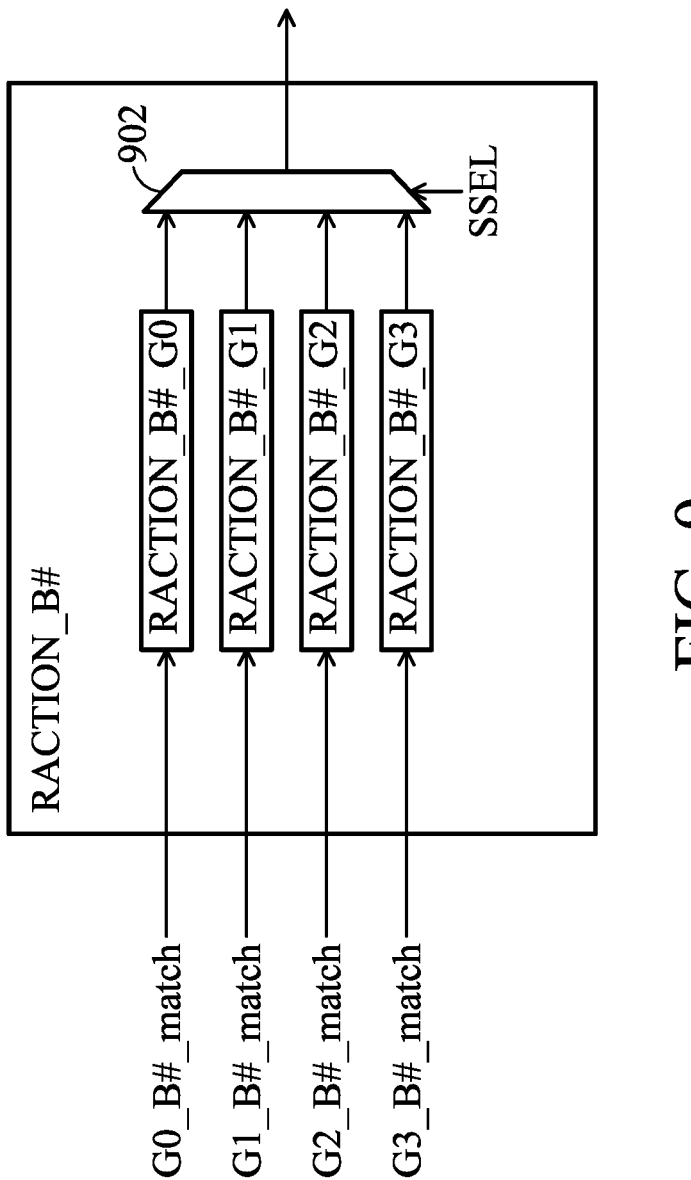
FIG. 9 illustrates the details of the action module RAC-TION_B #in accordance with an exemplary embodiment of the disclosure.

FIG. 9 illustrates the details of the action module RACTION_B #in accordance with an exemplary embodiment of the disclosure. The action module RACTION_B #receives record bits G0_B #_match, G1_B #_match, G2_B #_match, and G3_B #_match, which show the matching status between the sampled operational information and the branch events with the same branch event number B #in the different branch event groups G0 . . . G3. The logics working according to these record bits G0_B #_match, G1_B #_match, G2_B #_match, and G3_B #_match are configured based on the aforementioned action registers RACTION_B #_G0[31:0], RACTION_B #_G1[31:0], and RACTION_B #_G2[31:0], RACTION_B #_G3[31:0], for generation of action predictions. These logics are named action sub-modules, and are also labeled RACTION_B #_G0, RACTION_B #_G1, RACTION_B #_G2, RACTION_B #_G3, the same labels as their corresponding action registers. The branch event group changing or debug triggering predicted by the action sub-modules RACTION_B #_G0 . . . RACTION_B #_G3 are handed over to the multiplexer 902, and the multiplexer 902 outputs one of them, under the control of the group selection signal SSEL (Gt), to the action multiplexer 810 of FIG. 8.

In a corner case, when the sampled operational information DS highly matches the branch events, overflow may happen on the FIFO 504. The arithmetic module 106 can also issue the debugging prompt 112 to report the overflow condition.

The quantity of hardware used in the foregoing embodiments can be modified and is not limited to those described in this paper. For example, the branch analysis module 506 shown in FIG. 5 may provide more stages of branch analysis sub-circuits to perform branch analysis on more matched records at the same time.

A method for built-in verification on a chip developed based on the above concept includes: collecting signals from a plurality of key nodes of the chip 100 to form operational information DIN; programming a plurality of registers 108 to define a branch-type trigger condition; and generating a debugging prompt 112 in response to the branch-type trigger condition defined in the plurality of registers 108 being satisfied by the operational information.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip with built-in verification, comprising:
a plurality of key nodes, providing signals to be collected as operational information; and
verification hardware, including a plurality of registers which are programmed to define a branch-type trigger condition, wherein the branch-type trigger condition is formed by sequence-related events, and the verification hardware further includes an arithmetic module that generates a debugging prompt in response to the branch-type trigger condition defined in the plurality of registers being satisfied by the operational information;
wherein:
the plurality of registers define a plurality of branch event groups, and a plurality of branch events for each branch event group;
the plurality of registers further plan actions in response to when a branch event has been matched, to decide whether to jump to another branch event group or not, or whether to generate the debugging prompt; and
the arithmetic module starts from an initial branch event group to perform branch event matching on the operational information, and jumps between the branch event groups until the arithmetic module generates the debugging prompt to show that the branch-type trigger condition is satisfied.

2. The chip as claimed in claim 1, wherein:

each branch event is defined by a characteristic register and a mask register;

the operational information is sampled to generate sampled operational information; and the mask register defines whether each bit of the sampled operational information is considered in the branch event matching or not.

3. The chip as claimed in claim 2, wherein:

corresponding to each branch event group, the plurality of registers define reference values for system variables;

the actions in response to each matched branch event are defined in an action register corresponding to the matched branch event;

each action register is programmed so that, in response to when a corresponding branch event has been matched, it is defined how to change the system variables, and how to judge the system variables based on their reference values defined for a current branch event group, to determine whether to jump out of the current branch event group; and each action register further defines that in response to when it has been determined to jump out of the current branch event group, to jump to another branch event group or to generate the debugging prompt.

4. The chip as claimed in claim 3, wherein:

the system variables are monitored with counters and timers.

5. The chip as claimed in claim 1, wherein:

the verification hardware further includes a sampling module;

the sampling module samples the operational information based on a quadruple-frequency clock, to generate sampled operational information; and the sampled operational information is processed by the arithmetic module according to one-times frequency clock, to check the branch-type trigger condition.

6. The chip as claimed in claim 5, wherein:

the sampling module operates according to rising edges and falling edges of a double frequency clock.

7. The chip as claimed in claim 6, wherein:

the sampling module includes a plurality of D flip-flops which are connected in series, and the D flip-flops connected in series operate according to the quadruple-frequency clock, wherein a first stage of the D flip-flops connected in series receives the operational information; and the sampling module further includes a plurality of parallel sampling D flip-flops, the parallel sampling D flip-flops operate according to the one-times frequency clock to sample output signals from final stages of the D flip-flops connected in series, and the parallel sampling D flip-flops output different batches of the sampled operational information in parallel.

8. The chip as claimed in claim 7, wherein:

the D flip-flops connected in series are numbered from 0 to 6 from their input stage to their end stage;

the parallel sampling D flip-flops are numbered from 0 to 3;

the parallel sampling D flip-flop of number 0 samples an output signal from the D flip-flop of number 6 based on the one-times frequency clock, and outputs information with number 0;

the parallel sampling D flip-flop of number 1 samples an output signal from the D flip-flop of number 5 based on the one-times frequency clock, and outputs information with number 1;

the parallel sampling D flip-flop of number 2 samples an output signal from the D flip-flop of number 4 based on the one-times frequency clock, and outputs information with number 2; and the parallel sampling D flip-flop of number 3 samples an output signal from the D flip-flop of number 3 based on the one-times frequency clock, and outputs information with number 3.

9. The chip as claimed in claim 7, without any logic components between adjacent D flip-flops which are connected in series.

10. The chip as claimed in claim 7, wherein the arithmetic module comprises:

a branch event matching module, comparing each batch of the sampled operational information with all branch events of the different branch event groups to obtain a matching record for each batch of the sampled operational information, wherein different record bits of one matching record correspond to the different branch events;

a first-in-first-out buffer, storing outputs of the branch event matching module, to buffer matching records in chronological order; and a branch analysis module, retrieving the matching records from the first-in-first-out buffer to identify a valid matching bit of each matching record, wherein, based on an action register corresponding to a branch event marked by the valid matching bit, the branch analysis module decides whether to jump to another branch event group or not, or to generate the debugging prompt.

11. The chip as claimed in claim 10, wherein the branch analysis module comprises at least one branch analysis sub-circuit, for separately processing the matching records taken from the first-in-first-out buffer, and each branch analysis sub-circuit comprises:

a plurality of multiplexers, each corresponding to a branch event number to receive record bits of branch events with the branch event number in the different branch event groups, and operating according to a group selection signal, wherein outputs of the multiplexers are transformed into a valid symbol that indicates the valid matching bit;

a plurality of action modules, each corresponding to a branch event number to generate an action prediction based on an action register of a branch event of the branch event number within a target branch event group selected by the group selection signal, to predict whether to jump to another branch event group or not, or whether to generate the debugging prompt; and an action multiplexer, receiving the group selection signal as well as every action prediction provided by the action modules, to output an action indication according to the valid symbol, wherein the action indication indicates whether to jump to another branch event group or not, or whether to generate the debugging prompt.

12. The chip as claimed in claim 11, wherein each action module corresponds to a target branch event number, and comprises:

a plurality of action sub-modules, receiving the record bits corresponding to the target branch event number with respect to the different branch event groups, wherein each action sub-module performs action prediction according to a corresponding action register;

a prediction multiplexer, receiving action predictions from the action sub-modules and operating according to the group selection signal, to output one of the received action predictions to the action multiplexer.

13. The chip as claimed in claim 11, wherein:

the branch analysis module uses multiple branch analysis sub-circuits which are connected in series; and the action indication provided by a first stage of the branch analysis sub-circuits is also used as a group selection signal in a second stage of the branch analysis sub-circuits.

14. A method for built-in verification on a chip, comprising:

collecting signals from a plurality of key nodes of the chip to form operational information; and programming a plurality of registers to define a branch-type trigger condition, wherein the branch-type trigger condition is formed by sequence-related events; and generating a debugging prompt in response to the branch-type trigger condition defined in the plurality of registers being satisfied by the operational information;

wherein:

the plurality of registers define a plurality of branch event groups, and a plurality of branch events for each branch event group;

the plurality of registers further plan actions in response to when a branch event has been matched, to decide whether to jump to another branch event group or not, or whether to generate the debugging prompt; and the method starts from an initial branch event group to perform branch event matching on the operational information, and jumps between the branch event groups until the debugging prompt is generated to show that the branch-type trigger condition is satisfied.

15. The method as claimed in claim 14, wherein:

each branch event is defined by a characteristic register and a mask register;

the operational information is sampled to generate sampled operational information; and the mask register defines whether each bit of the sampled operational information is considered in the branch event matching or not.

16. The method as claimed in claim 15, wherein:

corresponding to each branch event group, the plurality of registers define reference values for system variables;

the actions in response to each matched branch event are defined in an action register corresponding to the matched branch event;

each action register is programmed so that, in response to when a corresponding branch event has been matched, it is defined how to change the system variables, how to judge the system variables based on the reference values to determine whether to jump out of a current branch event group or not; and each action register further defines that in response to when it has been determined to jump out of the current branch event group, to jump to another branch event group or to generate the debugging prompt.

17. The method as claimed in claim 16, wherein:

the system variables are monitored with counters and timers.

18. The method as claimed in claim 14, further comprising:

sampling the operational information based on a quadruple-frequency clock to generate sampled operational information, wherein the quadruple-frequency clock is formed by rising edges and falling edges of a double-frequency clock; and checking the branch-type trigger condition according to one-times frequency clock.

19. The method as claimed in claim 18, further comprising:

providing a plurality of D flip-flops which are connected in series, wherein the D flip-flops connected in series operate according to the quadruple-frequency clock, and a first stage of the D flip-flops connected in series receives the operational information; and providing a plurality of parallel sampling D flip-flops, wherein the parallel sampling D flip-flops operate according to the one-times frequency clock to sample output signals from final stages of the D flip-flops connected in series, and the parallel sampling D flip-flops output different batches of the sampled operational information in parallel.

20. The method as claimed in claim 19, further comprising:

comparing each batch of the sampled operational information with all branch events of the different branch event groups to obtain a matching record for each batch of the sampled operational information, wherein different record bits of one matching record correspond to the different branch events;

providing a first-in-first-out buffer to buffer matching records in chronological order; and retrieving the matching records from the first-in-first-out buffer to identify a valid matching bit of each matching record and, based on an action register corresponding to a branch event marked by the valid matching bit, deciding whether to jump to another branch event group or not, or to generate the debugging prompt.

* * * * *